H. F. WHITTED.
BALL AND SOCKET DEVICE.
APPLICATION FILED FEB. 21, 1921.

1,425,730. Patented Aug. 15, 1922.

WITNESSES

INVENTOR
Howard F. Whitted,
BY
ATTORNEYS.

UNITED STATES PATENT OFFICE.

HOWARD FERRIS WHITTED, OF SANTA PAULA, CALIFORNIA.

BALL AND SOCKET DEVICE.

1,425,730.　　　　　Specification of Letters Patent.　Patented Aug. 15, 1922.

Application filed February 21, 1921. Serial No. 446,748.

*To all whom it may concern:*

Be it known that I, HOWARD FERRIS WHITTED, a citizen of the United States, and a resident of Santa Paula, in the county of Ventura and State of California, have invented certain new and useful Improvements in Ball and Socket Devices, of which the following is a specification.

The present invention relates in general to ball and socket devices and more particularly to ball and socket devices especially adapted to be organized with the gear shifting lever of an automobile transmission or the like.

The object of the invention is to provide a device of this character in which the ball is held firmly in the socket and all vibration or rattling is eliminated, which takes up wear, and which is of simple and durable construction, reliable in operation and easy and inexpensive to manufacture.

Other objects and advantages of the invention reside in certain novel features of construction, combination and arrangement of parts which will be hereinafter more fully described and claimed, reference being had to the accompanying drawings forming part of this specification, and in which:

Figure 1:
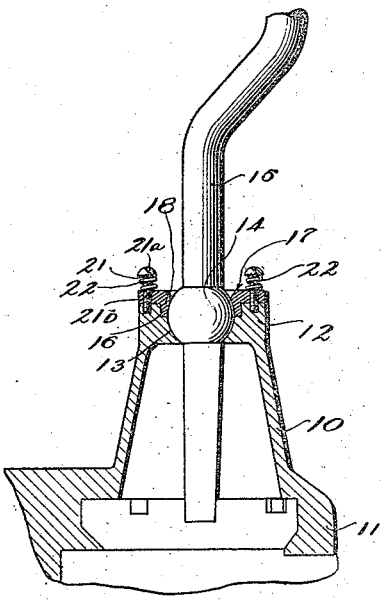
Figure 1 is a view, partly in section and partly in elevation illustrating the ball and socket mounting for the conventional gear shift lever.
Figure 2:
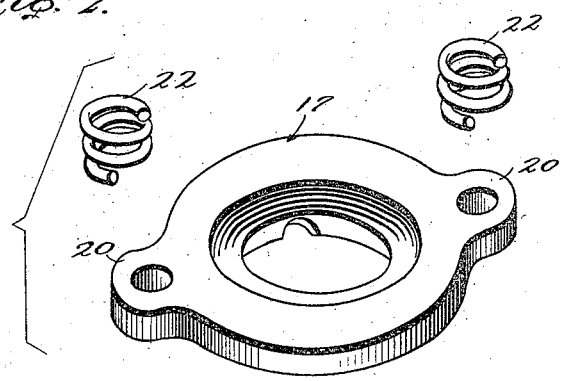
Figure 2 is a perspective view of the cap and associated springs.
Figure 3:
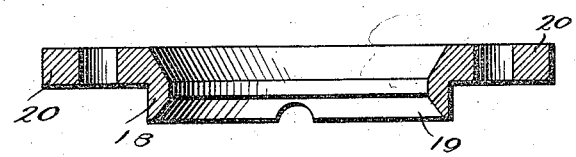
Figure 3 is a transverse sectional view of the cap.

Referring to the drawings wherein for the sake of illustration is shown the preferred embodiment of the invention, the numeral 10 designates a pedestal usually formed integral with the gear casing 11. At the upper end of the pedestal the socket member 12 is provided, being preferably integral with the pedestal 10. The socket member has formed thereon a concave bearing surface 13, upon which the ball 14 of the gear shift lever 15 operatively bears. An annular groove 16 is provided in the socket member adjacent the upper end of the bearing surface 13.

A cap designated generally at 17, is arranged upon the socket member and is provided with a depending annular flange 18 which enters the annular groove of the socket member and secures the cap against lateral displacement. The cap is also provided with a concave bearing surface 19 which is complementary to the bearing surface 13 of the socket member and which bears upon the ball 14 of the gear shifting lever and confines this ball in the socket.

Means is provided for resiliently securing the cap to the socket member. For this purpose the cap has formed at diametrically opposite points thereon a pair of apertured ears 20. Screws 21 have their threaded shanks 21$^b$ extended through the apertures of the ears 20 and seated in suitable threaded recesses provided therefor in the socket member. The screws have heads 21$^a$ arranged exteriorly of the cap and preferably provided with the usual slots for the reception of an operating tool. Coil springs 22 are arranged on the shanks of the screws and are interposed between the heads thereof and the cap. In this manner the screws and the springs cooperate to secure the cap in position.

In practice after the ball has been placed in the socket, the cap is then positioned with its annular flange disposed in the annular groove of the socket. Coil springs are then arranged on the shanks of the screws and the screws positioned in the apertures of the ears and threaded home in the recesses provided therefor in the socket member. As the screws are tightened the heads thereof compress the springs 22 and this compressive force is resiliently exerted upon the cap to resiliently maintain it in position. Thus any rattling or vibration is prevented, it being taken up by the springs and wear is also automatically taken up. It is obvious that when it is desirable to do so the screws may be further tightened to increase the tension of the springs 22.

I claim:

1. In a device of the character described, a pedestal, a socket member carried by the upper end of said pedestal and having a concave bearing surface and an annular groove adjacent said bearing surface, a gear shift lever having a ball universally journaled on said bearing surface, a cap superposed on said socket and having an annular flange slidably fitted in the annular groove and a concave bearing surface complementary to the concave bearing surface of the socket, said cap having apertured ears and said socket having threaded recesses alined with said apertured ears, screws having threaded shanks extending through the apertured ears and seated in the threaded recesses of the socket and having heads at their outer end, and coil springs on the shanks of said screws and interposed between the heads thereof and said cap.

2. In a device of the character described, a socket having a concave bearing surface, and an annular groove adjacent said bearing surface, a gear shift lever having a ball universally journaled on said bearing surface, a cap having an annular flange slidably fitted in said groove and having a concave bearing surface complementary to the concave bearing surface of the socket, and means for resiliently securing the cap in position including screws and coil springs tensioned by said screws and bearing against said cap.

3. In a device of the character described, a socket, a ball operating in said socket, a cap for securing the ball in position in the socket, cooperating guide means between the cap and the socket for preventing lateral displacement of the cap and for constraining the cap to axial movement toward and away from the socket, and means for resiliently resisting movement of the cap axially away from said socket.

HOWARD FERRIS WHITTED.